(12) United States Patent
Draz et al.

(10) Patent No.: US 6,545,841 B1
(45) Date of Patent: Apr. 8, 2003

(54) STRATEGY FOR READ/WRITE SPACING REQUIREMENT

(75) Inventors: Rick A. Draz, Lakeville, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/499,829

(22) Filed: Feb. 8, 2000

Related U.S. Application Data
(60) Provisional application No. 60/119,306, filed on Feb. 8, 1999.

(51) Int. Cl.[7] .......................... G11B 21/21; G11B 17/32; G11B 5/60
(52) U.S. Cl. ................................. 360/234.7; 360/236.5
(58) Field of Search .......................... 360/234.7, 235.7, 360/235.4, 236.2, 236.9, 236.5

(56) References Cited

U.S. PATENT DOCUMENTS

| 5,166,845 A | | 11/1992 | Thompson et al. | |
| 5,822,153 A | * | 10/1998 | Lairson et al. | 360/104 |
| 5,991,113 A | | 11/1999 | Meyer et al. | |
| 5,991,119 A | | 11/1999 | Boutaghou et al. | |
| 6,098,880 A | * | 8/2000 | Meyer et al. | 235/449 |
| 6,304,419 B1 | * | 10/2001 | Souda et al. | 360/236.9 |

FOREIGN PATENT DOCUMENTS

| EP | 0 479 703 A1 | * | 4/1992 |
| JP | 4-209304 | * | 7/1992 |
| JP | 6-267221 | * | 9/1994 |

* cited by examiner

Primary Examiner—William Klimowicz
(74) Attorney, Agent, or Firm—Merchant & Gould P.C.

(57) ABSTRACT

A read/write head includes a slider flying above a rotating disc. The slider has an upper side, a lower side, and a trailing edge face. The lower side faces the rotating disc and is separated from the rotating disc by an air gap. A write transducer is located on the lower side of the slider and is at a first height above the rotating disc. A read transducer is located on the lower side of the slider and is at a second height above the rotating disc. The second height is greater than the first height.

10 Claims, 4 Drawing Sheets

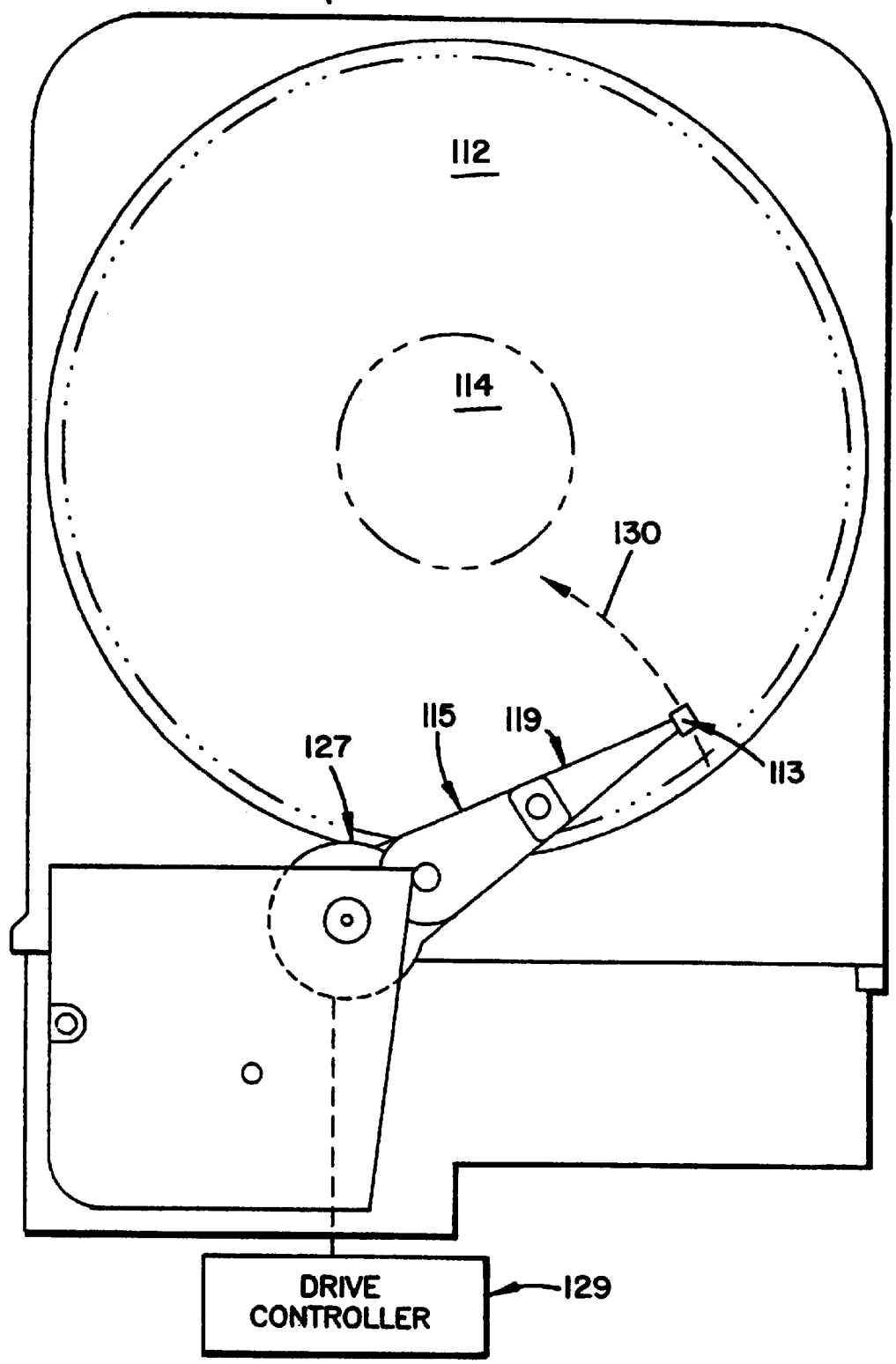

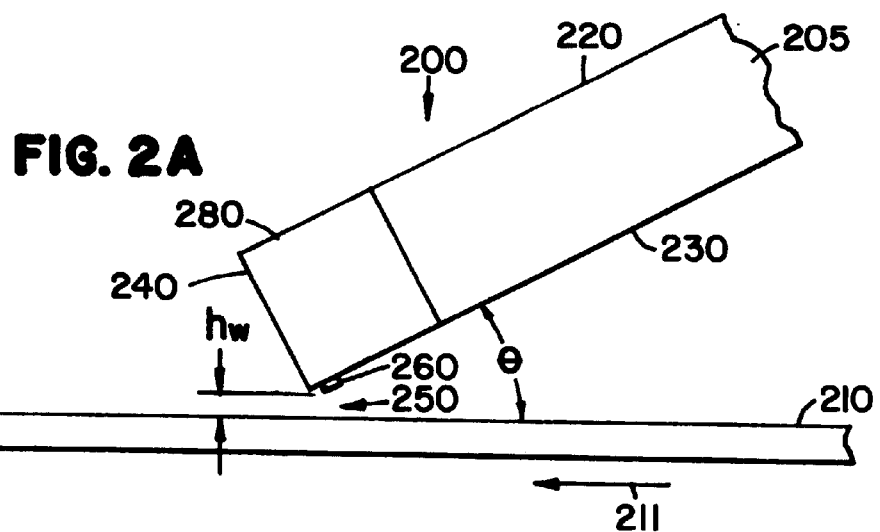
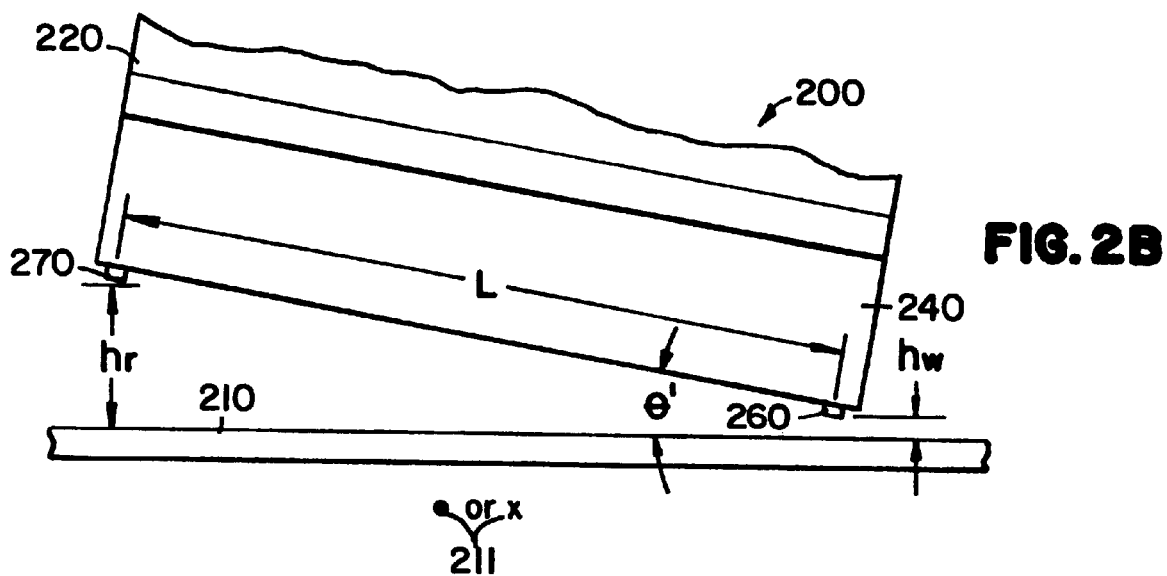

STRATEGY FOR READ/WRITE SPACING REQUIREMENT

This application claims the benefit of and is a continuation-in-part of the provisional application Ser. No. 60/119,306, entitled "Strategy for Read/Write Spacing Requirements," filed Feb. 8, 1999 which is incorporated herein.

FIELD OF THE INVENTION

This invention relates generally to read/write head sliders or transducers. More particularly this invention relates to read and write transducers that are physically separated from each other with the read transducer located a greater distance above a disc than the write transducer.

BACKGROUND OF THE INVENTION

Rotating disc magnetic recording systems typically employ magnetic head transducers which glide over the magnetic disc media on a cushion of air. The mounting or support structure which carries the transducers are termed "sliders." Sliders have air-bearing surfaces that are propelled off the surface of moving media by boundary air which moves with the media disc. The air-bearing surface of a slider is aerodynamically designed to glide on the boundary air due to a pattern of raised rails and recesses which establish the "fly height" of the slider. Read/write transducers are mounted on the air-bearing side of the slider, facing the moving media.

A slider assembly typically includes the ceramic slider and associated read/write heads, a support flexure arm, interconnection wires between the heads and external signaling devices, and any associated mounting hardware. That assembly is mounted on an arm which is movable over the surface of a rotating magnetic disc to position the slider adjacent selected tracks on the disc. Disc drives usually employ multiple discs which rotate together, spaced apart from one another on a single spindle. One slider assembly is provided for each magnetic recording surface in a disc drive.

In magnetic disc drive data storage devices, digital data are written to and read from a thin layer of magnetizable material on a surface of one or more rotating discs. Write and read operations are performed through write and read transducers. The slider and transducers are sometimes collectively referred to as a head, and typically a single head is associated with each disc surface. When the read transducer is a magnetoresistive (MR) type sensor, the combination of the slider and the transducer are frequent referred to as a MR head. The head is selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly above the disc surface.

It is desirable for the air-bearing surface of a slider to fly as close to the media as possible, without actually physically touching the media. Read/write signal strength is dependent on the spacing between the thin layer of magnetizable material on the surface of the rotating disc and the read/write head. A close spacing between the thin layer of magnetizable material on the surface of the rotating disc and the read/write head substantially improves the transducer's performance.

It is also important for the spacing between the slider and media disc to be invariant from the innermost to the outermost diameter data tracks. The fly height of the read/write head above the media should be the same at the inner diameter, mid diameter and outer diameter of the disc. This is difficult since the media travels faster as the read/write head moves from the inner diameter towards the outer diameter of the disc.

Thermal effects are exaggerated by slider flying heights that are very close to the media. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials. This effect is seen on the slider most often near the transducers that are located proximate to one another. Due to differences in material thermal expansion properties, the transducers are usually encapsulated in insulating material that differs from the material of the slider body. The insulating material expands at a different rate than the material of the slider body in response to a given temperature increase. As current flows into the transducer, the material surrounding the transducer is heated and expands due to Ohm's law. The expansion of the material surrounding the transducer forms a protrusion directed towards the disk. This unwanted effect is known as thermal pole tip protrusion. Thus, reduced flying heights increase the need to take thermal expansion and thermally induced elastic deformation into account.

In operation, the MR element (MRE) of the head can come into contact with asperities on the surface of the disc. This is particularly true in proximity type heads where the inductive write transducer comes into frequent contact with the surface of the disc. Potentially, this contact between the MRE and asperities can cause data written to a particular location on the disc to be lost. Immediately after contact with an asperity, the heat generated by the contact changes the resistive properties of the MR sensor. As a result, the corresponding signal read by the MR head is distorted by a voltage spike and subsequent decay, sometimes causing the data stored near the asperity to be unrecoverable. The voltage spike in the read back signal is frequently referred to as a "thermal asperity," while the defect on the disc is referred to as an "asperity". However, since one is indicative of the other, the two terms are frequently used interchangeably. Since disc media contain asperities, proximate MR sensors have to be designed to prevent the MR sensor from physically touching the media and creating thermal asperities in the read back signal. Thus, these MR sensors are designed to fly higher above the media to prevent contact with the media and as a result of the greater fly height, these sensors also have decreased signal strength.

Therefore, there is a need for improved read/write slider design that will reduce slider fly height above the media, maintain a constant fly height across the disc, and minimize both thermal pole tip protrusion and thermal asperities.

SUMMARY OF THE INVENTION

According to a first aspect of the present invention there is provided a read/write head that includes a slider flying above a rotating disc. The slider has an upper side, a lower side, and a trailing edge face. The lower side faces the rotating disc and is separated from the rotating disc by an air gap. A write transducer is located on the lower side of the slider and is a first height above the rotating disc. A read transducer is located on the lower side of the slider and is a second height above the rotating disc. The second height is greater than the first height.

According to another aspect of the invention there is provided a disc drive system that includes a magnetic recording disc and a slider flying above the disc. The slider has an upper side, a lower side, and a trailing edge face. The lower side faces the rotating disc and is separated from the disc by an air gap. A write transducer is located on the lower side of the slider and is a first height above the rotating disc. A read transducer is located on the lower side of the slider and is a second height above the rotating disc. The second height is greater than the first height. The disc drive system includes an actuator for moving the slider across the magnetic recording disc and a detection circuitry electrically coupled to the slider for detecting changes in resistance of the slider caused by magnetic fields from the magnetically recorded data.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 1 is a simplified drawing of a magnetic recording disc system.

FIG. 2A is a diagrammatic side view of a portion of a flying slider in accordance with a preferred embodiment of the present invention.

FIG. 2B is a diagrammatic rear view of the flying slider shown in FIG. 2A.

DETAILED DESCRIPTION OF THE PRESENTLY PREFERRED EMBODIMENTS

Figure 3A:
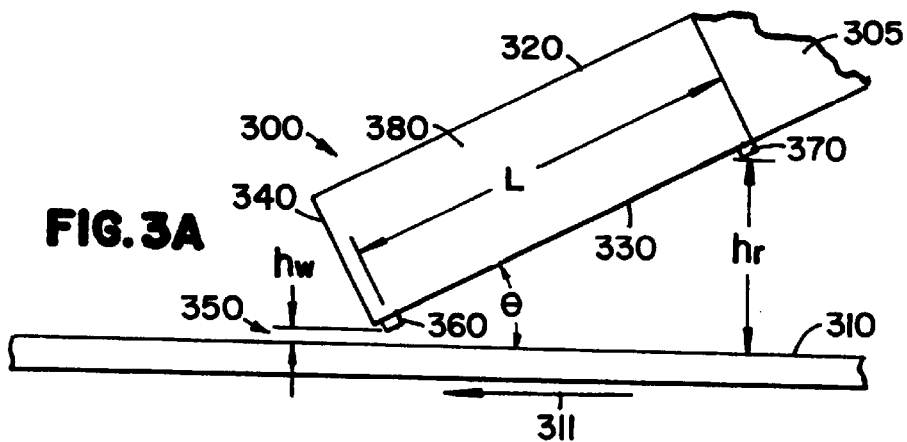
FIG. 3A is a diagrammatic side view of a portion of a flying slider in accordance with a preferred embodiment of the present invention.

The following description is a detailed description of the preferred embodiments presently contemplated for carrying out the present invention. This description is made for the purpose of illustrating the general principles of the present invention and is not meant to limit the inventive concepts claimed herein.

FIG. 1 shows a disc drive system 100 embodying the present invention. As shown in FIG. 1, at least one rotatable magnetic disc 112 is supported on a spindle 114 and rotated by a disc drive motor. The magnetic recording media on each disc is in the form of an annular pattern of concentric data tracks (not shown) on disc 112.

At least one slider 113 is positioned on the disc 112, each slider 113 supporting one or more magnetic read/write heads incorporating the present invention. As the discs rotate, slider 113 is moved radially in and out as shown by arrow 130 over the disc surface so that the heads located on the slider 113 may access different portions of the disc where desired data is either recorded or to be written. Each slider 113 is attached to an actuator arm 115 by a suspension 119. The suspension 119 provides a slight spring force which biases the slider 113 against the disc surface. Each actuator arm 115 is attached to an actuator 127.

During operation of the disc storage system, the rotation of disc 112 generates an air bearing between an air bearing surface (ABS) on the slider 113. The ABS is the surface of slider 112 which includes a reading head and faces the surface of disc and the disc surface. The air bearing exerts an upward force or lift on the slider 113. The air bearing thus counter-balances the slight spring force of suspension 119 and supports the slider slightly 113 above the disc 112 surface by a small, substantially constant spacing during normal operation.

The various components of the disc storage system are controlled in operation by control signals generated by control unit 129, such as access control signals and internal clock signals. Typically, control unit 129 includes logic control circuits, storage and a microprocessor. The control unit generates control signals to control various system operations such as drive motor control signals and head position and seek control signals. The control signals provide the desired current profiles to optimally move and position slider 113 to the desired data track on disc 112.

The above description of a typical magnetic disc storage system, and the accompanying illustration of FIG. 1 are for representation purposes only. It should be apparent that disc storage systems may contain a large number of discs and actuators, and each actuator may support a number of sliders.

FIGS. 2A and 2B illustrate a slider 200 flying above a rotating disc 210 at a pitch angle θ. The flying slider 200 is separated from the disc 210 by an air gap 250. The rotation of the disc is illustrated by an arrow 211, the rotation is either into the page or coming out of the page as shown by the arrow head and tail 211 of FIG. 2B. The slider body 205 is formed primarily of a ceramic material, e.g. a combination of alumina (aluminum oxide, $Al_2O_3$) and titanium carbide (TiC), a substantially crystalline structure. The slider body 205 has an upper side 220 and a lower side 230 substantially parallel to each other. On the lower side 230 near its trailing edge face 240, a read transducer 270 and a write transducer 260 are located. The read transducer 270 and a write transducer 260 are substantially encapsulated in an insulating first part 280, such as, for example, amorphous aluminum oxide with exposed pole tips outside the insulating first part 280.

FIG. 2B illustrates the read transducer 270 and a write transducer 260 physically separated by a transducer gap L. This transducer gap L can be about 25 to 200 μm and preferably about 100 to 150 μm. FIG. 2B illustrates a read transducer 270 and the write transducer 260 located along a first axis that is parallel to the trailing edge face 240. The read transducer 270 and a write transducer 260 do not need to be located on the first axis, instead any location of the read transducer 270 and the write transducer 260 is within in the spirit of the present invention as long as the read transducer 270 and the write transducer 260 are physically separated from one another.

FIG. 2B shows the flying slider 200 has a roll angle θ'. The roll angle θ' causes the read transducer 270 to be separated from the disc a greater distance than the write transducer 260. The roll angle θ' can be about 25 to 100 μrad.

The roll angle can be generated by slider design aerodynamics. The write transducer 260 is separated from the disc by a first height $h_w$. The read transducer 270 is separated from the disc by a second height $h_T$ where the first height $h_w$ is less than the second height $h_r$. When designing the read/write head, a height difference ($\Delta h_{rw}$) of the read transducer 270 and the write transducer 260 can be determined according to the equation:

$$\Delta h_{rw} = L \times \theta'$$

The transducer gap L is measured in μm, the roll angle θ' is measured in μrad (microradians). Roll values of 40–50 μrad and a transducer gap of 150 μm give a transducer height difference $\Delta h_{rw}$ of about 7.5 nm.

Figure 4:
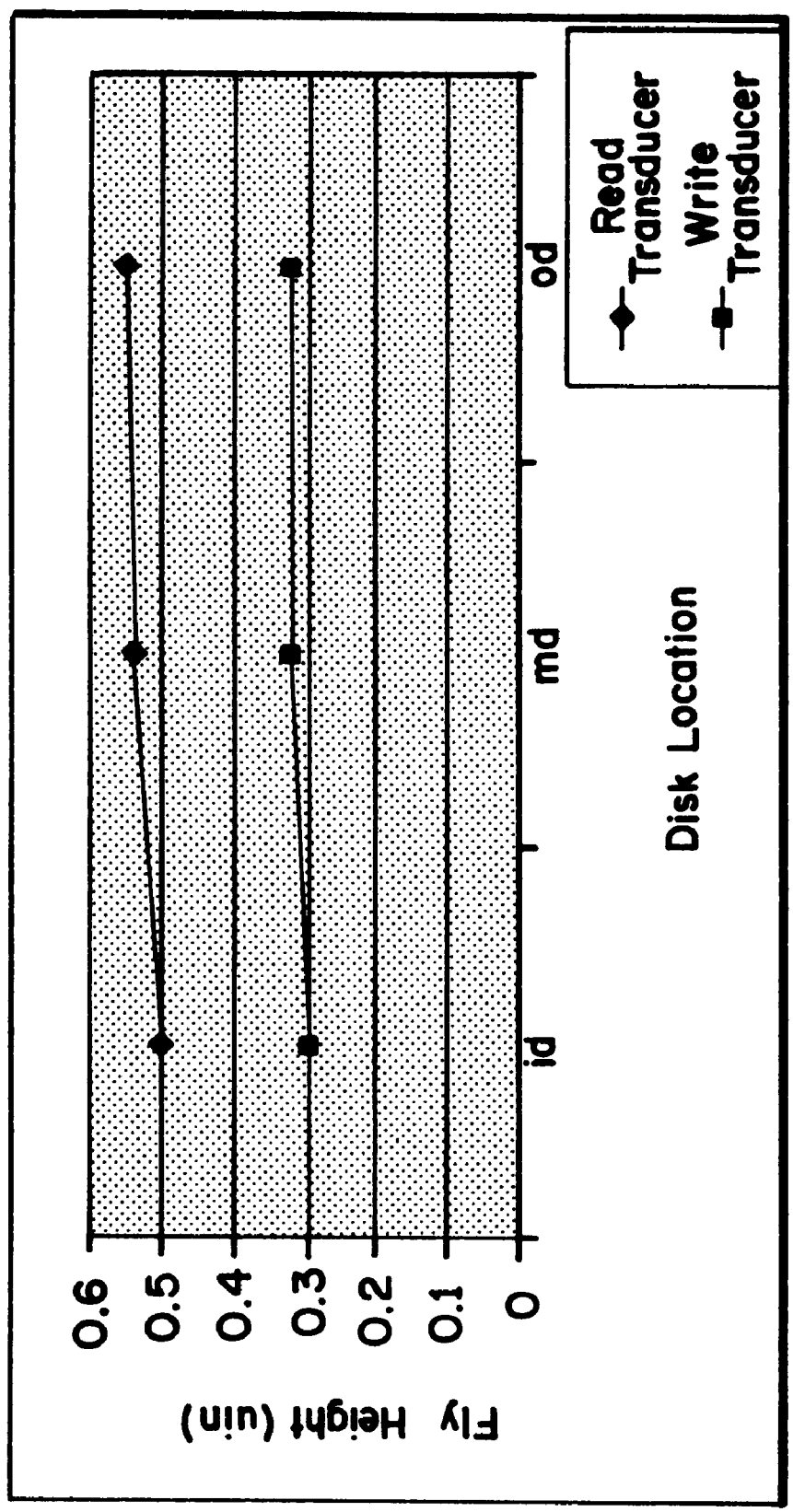
FIG. 4 is a chart illustrating the fly height of the read transducer and write transducer as the read/write head travels from the inner diameter to the outer diameter of the disc.

FIG. 4 is a chart that illustrates the fly height of the read transducer 270 and write transducer 260 as the read/write head travels from the inner diameter to the outer diameter of a disc. This chart shows that as the slider travels across the rotating disc, starting at an inner diameter (id) to a middle diameter (md) to a outer diameter (od), both the write transducer 260 first height $h_w$ and the read transducer 270 second height $h_r$ are substantially constant and the height difference $\Delta h_{rw}$ between the write transducer 260 and the read transducer 270 is substantially constant.

By physically separating the write transducer 260 and the read transducer 270, the read/write head can fly closer to the disc without the read transducer 270 coming into contact with the disc 210. Since the read transducer 270 always is separated from the disc 210 a distance greater than the write transducer 260, the write transducer will always contact the disc 210 before the read transducer 270. The greater distance between the read transducer 270 and the disc 210 prevents the read transducer 270 from coming into contact with asperities on the surface of the disc 210. Preventing the read transducer 270 from contacting an asperity on the media prevents the generation of heat and prevents changes to the resistive properties of the MR sensor. As a result, the corresponding signal read by the MR head is not distorted by a voltage spike and subsequent data decay. This voltage spike in the read back signal is frequently referred to as a "thermal asperity." Thus, the problem of thermal asperities is minimized while maintaining a minimum fly height between the write transducer and the surface of the media.

By physically separating the write transducer 260 and the read transducer 270, the amount of insulating first part 280 is reduced as compared to traditional read/write transducers that are proximate to each other. The thickness of the insulating first part 280 can be reduced to about 10 to 20 μm. Thus, with a reduced thickness of insulating first part 280, the problem of thermal pole tip protrusion is minimized.

FIG. 3A illustrate a slider 300 flying above a rotating disc 310 at a pitch angle θ. The slider shown in FIG. 3A and FIG. 3B does not have a roll angle. The flying slider 300 is separated from the disc 310 by an air gap 350. The rotation of the disc is illustrated by an arrow 311. The slider body 305 is formed primarily of a ceramic material, e.g. a combination of alumina (aluminum oxide, $Al_2O_3$) and titanium carbide (TiC), a substantially crystalline structure. The slider body 305 has an upper side 320 and a lower side 330 substantially parallel to each other. On the lower side 330 near its trailing edge face 340, a read transducer 370 and a write transducer 360 are located. The read transducer 370 and a write transducer 360 are substantially encapsulated in an insulating first part 380, such as, for example, amorphous aluminum oxide with exposed pole tips outside the insulating first part 380.

FIG. 3A illustrates the read transducer 370 and a write transducer 360 physically separated by a transducer gap L. This transducer gap L can be about 25 to 200 μm and preferably about 35 to 100 μm. FIG. 3A illustrates the read transducer 370 and a write transducer 360 located on a second axis that is perpendicular to the trailing edge face 340. The read transducer 370 and a write transducer 360 do not need to be located on the second axis, any location of the read transducer 370 and a write transducer 360 is within in the spirit of the present invention as long as the read transducer 370 and a write transducer 360 are physically separated from one another.

Figure 3B:
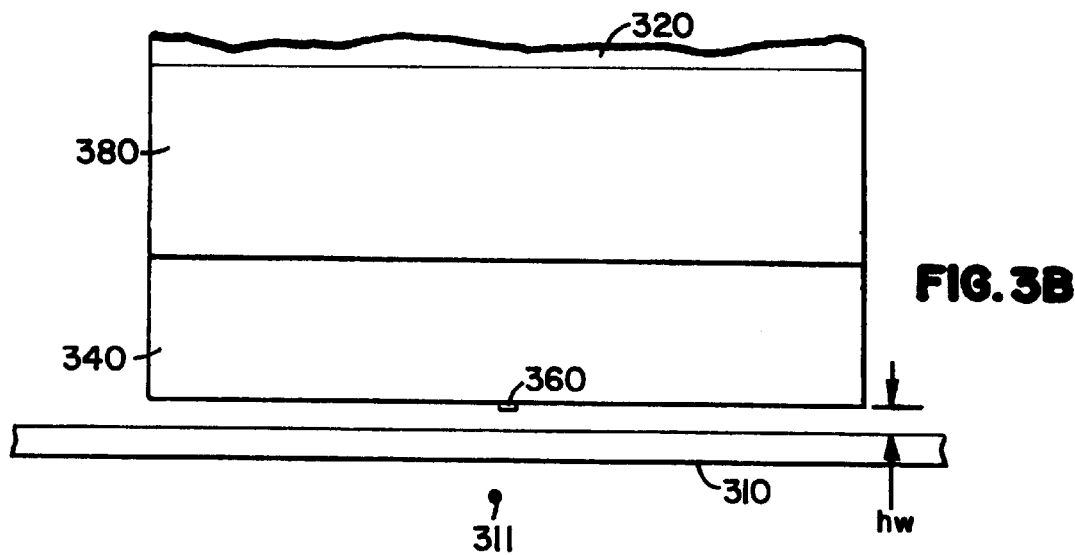
FIG. 3B is a diagrammatic rear view of the flying slider shown in FIG. 3A.

FIG. 3B shows the flying slider 300 without a roll angle θ'. In this embodiment, the pitch angle θ causes the read transducer 370 to be separated from the disc a greater distance than the write transducer 360. The pitch angle θ can be about 100 to 200 μrad. The pitch angle θ can be generated by slider design aerodynamics. The write transducer 360 is separated from the disc by a first height $h_w$. The read transducer 370 is separated from the disc by a second height $h_r$. Thus, the write transducer 360 first height $h_w$ is less than the read transducer 370 second height $h_r$. When designing the read/write head, the height difference ($\Delta h_{rw}$) of the read transducer 370 and the write transducer 360 can be determined according to the equation:

$$\Delta h_{rw} = L \times \theta$$

The transducer gap L is measured in μm, the pitch angle θ is measured in μrad (microradians). Pitch values of about 130 to 150 μrad and a transducer gap of 50 μm give a transducer height difference $\Delta h_{rw}$ of about 7.5 nm.

By physically separating the write transducer 360 and the read transducer 370, the read/write head can fly closer to the disc without the read transducer 370 coming into contact with the disc 310. Since the read transducer 370 always is separated from the disc 310 a distance greater than the write transducer 360, the write transducer will always contact the disc 310 before the read transducer 370. The greater distance between the read transducer 370 and the disc 310 prevents the read transducer 370 from coming into contact with asperities on the surface of the disc 310. Thus, the problem of thermal asperities is minimized.

In summary, a read/write head is provided having a slider (200, 300), a write transducer (260, 360), and a read transducer (270, 370). The slider (200, 300) has an upper side (220, 320), a lower side (230, 330), and a trailing edge face (240, 340). The lower side (230, 330), faces a disc (210, 310) rotating under the read/write head and is separated from the disc by an air gap (250, 350). The write transducer (260, 360), and read transducer (270, 370) are located on the lower side (230, 330) of the slider (200, 300). The write transducer (260, 360) is located at a first height ($h_w$) above the disc (210, 310) and the read transducer (270, 370) is located at a second height ($h_r$) above the disc (210, 310) where the second height ($h_r$) is greater than the first height ($h_w$).

Also provided is a disc drive system that includes a slider (200, 300), write transducer (260, 360) and read transducer (270, 370) as described above. Also included is an actuator (127) for moving the slider (200, 300) across the disc (210, 310) and a detection circuitry (129) electrically coupled to the slider (200, 300) for detecting changes in the resistance of the slider (200, 300) caused by magnetic fields for the disc (210, 310).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A read/write head comprising:

a slider having an upper side, a lower side, and a trailing edge face, the lower side faces a disc rotating under the read/write head and is separated from the disc by an air gap;

a write transducer located on the lower side of the slider wherein the write transducer is located at a first height above the disc; and a read transducer located on the lower side of the slider wherein the read transducer is located at a second height above the disc wherein the second height is greater than the first height;

wherein the read transducer is physically separated from the write transducer by a transducer gap wherein the transducer gap is about 25 to 200 $\mu$m wherein the read transducer and the write transducer are aligned along a first axis which is parallel to the trailing edge face and the lower side forms a roll angle perpendicular to the rotation of the disc;

wherein further said read and write transducers are disposed in a non-contiguous manner with respect to each other.

2. The read/write head of claim 1, wherein a difference between the first height and the second height remain substantially constant as the read/write head travels from an inner diameter to an outer diameter of the disc.

3. The read/write head of claim 1, wherein the transducer gap is about 35 to 100 $\mu$m.

4. The read/write head claims 1, wherein the lower side forms a pitch angle parallel to the rotation of the disc.

5. The read/write head of claim 4, wherein the pitch angle is about 100 to 200 $\mu$rad.

6. The read/write head of claim 1, wherein the roll angle is about 25 to 100 $\mu$rad.

7. The read/write head of claim 1, wherein the read transducer and the write transducer are located on an insulative first part of the slider.

8. The read/write head of claim 7, wherein the insulative first part has a thickness of about 10 to 20 $\mu$m.

9. A disc drive system, comprising:

a slider flying above a disc, the slider has an upper side, a lower side, and a trailing edge face, the lower side faces the rotating disc and is separated from the rotating disc by an air gap;

a write transducer located on the lower side of the slider wherein the write transducer is located at a first height above the rotating disc;

a read transducer located on the lower side of the slider wherein the read transducer is located at a second height above the rotating disc wherein the second height is greater than the first height;

an actuator for moving the slider across the disc; and a detection circuitry electrically coupled to the read transducer for detecting changes in resistance of the read transducer caused by magnetic fields from the disc;

wherein said read and write transducers are disposed in a non-contiguous manner with respect to each other wherein the read transducer is physically separated from the write transducer by a transducer gap wherein the transducer gap is about 25 to 200 $\mu$m wherein the read transducer and the write transducer are aligned along a first axis which is parallel to the trailing edge face and the lower side forms a roll angle perpendicular to the rotation of the disc.

10. A read/write head comprising:

a slider having an upper side, a lower side, and a trailing edge face, the lower side faces a disc rotating under the read/write head and is separated from the disc by an air gap;

write means located on the lower side of the slider wherein the write means is located at a first height above the disc; and read means located on the lower side of the slider wherein the read means is located at a second height above the disc wherein the second height is greater that the first height;

wherein said read and write means are disposed in a non-contiguous manner with respect to each other wherein the read means is physically separated from the write means by a gap wherein the gap is abut 25 to 200 $\mu$m wherein the read means and the write means are aligned along a first axis which is parallel to the trailing edge face and the lower side forms a roll angle perpendicular to the rotation of the disc.

* * * * *

UNITED STATES PATENT AND TRADEMARK OFFICE
CERTIFICATE OF CORRECTION

PATENT NO. : 6,545,841 B1
DATED : April 8, 2003
INVENTOR(S) : Draz et al.

It is certified that error appears in the above-identified patent and that said Letters Patent is hereby corrected as shown below:

<u>Column 1,</u>
Line 49, "frequent" should read -- frequently --

Signed and Sealed this

Seventh Day of October, 2003

JAMES E. ROGAN
*Director of the United States Patent and Trademark Office*